H. STANLEY.
Rotary Digger.
No. 47,996.
3 Sheets—Sheet 3.
Patented May 30, 1865.
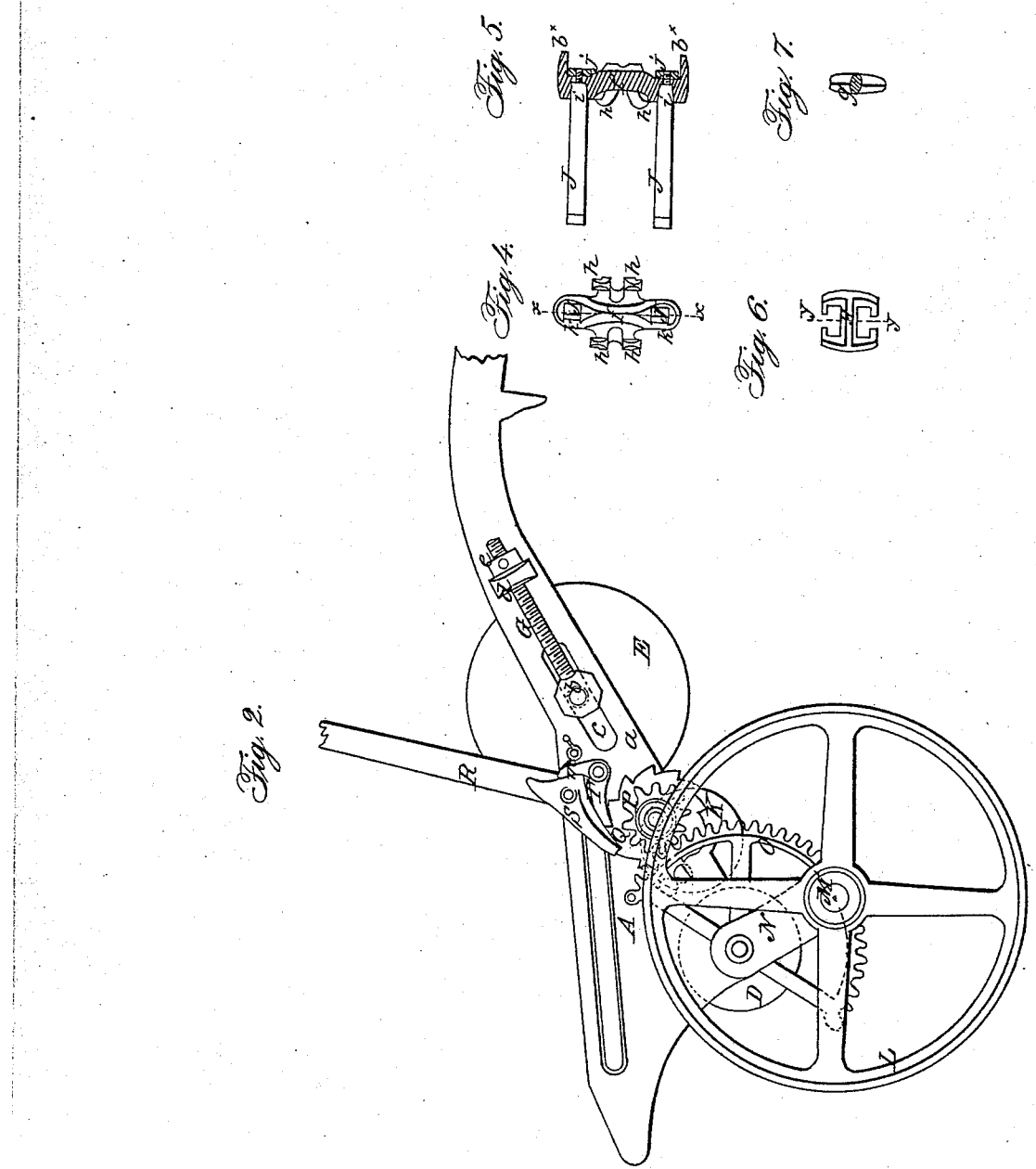
Witnesses:
Gustave Dieterich
M. Heame Jr.
Inventor:
Henry Stanley

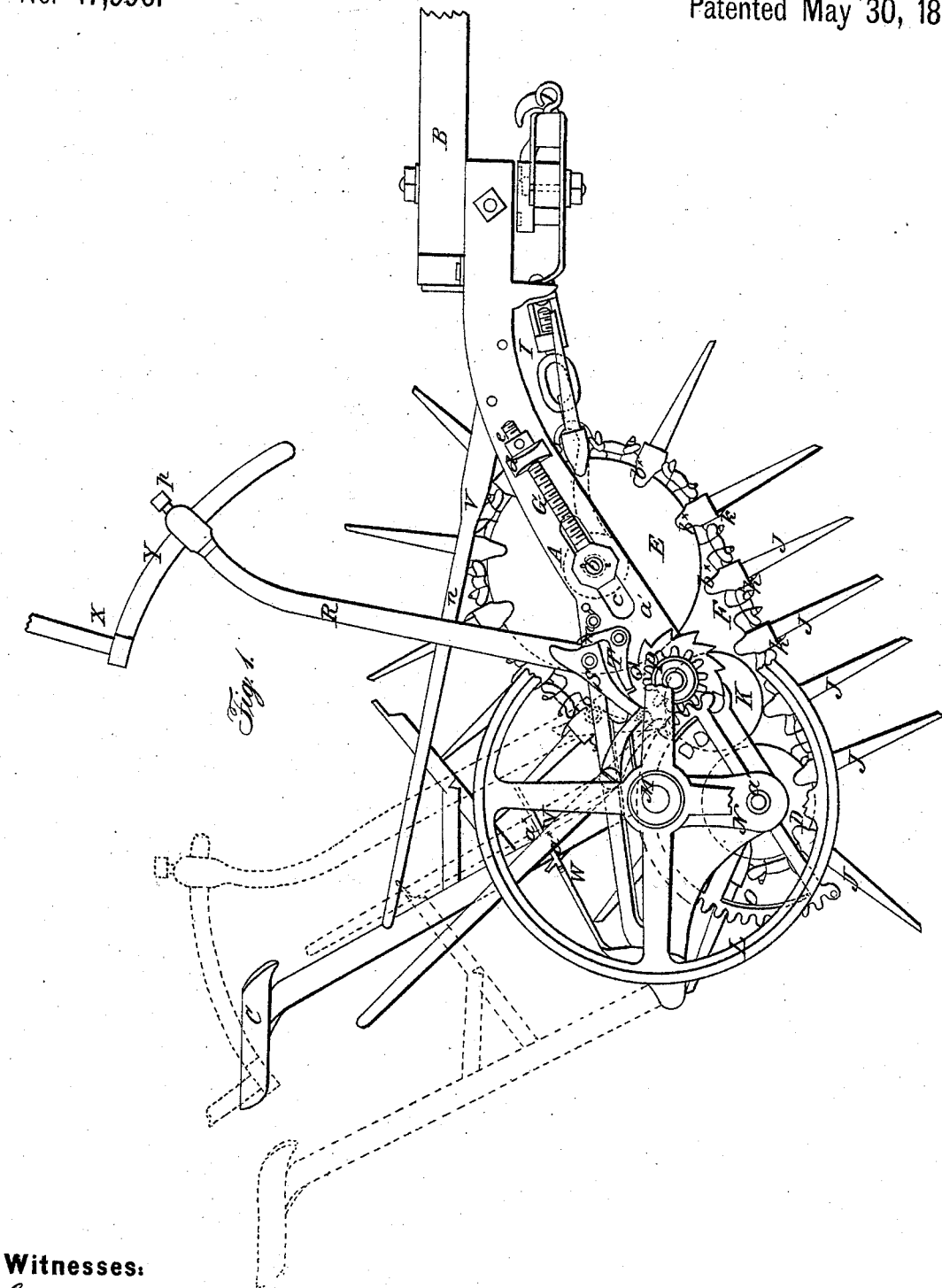

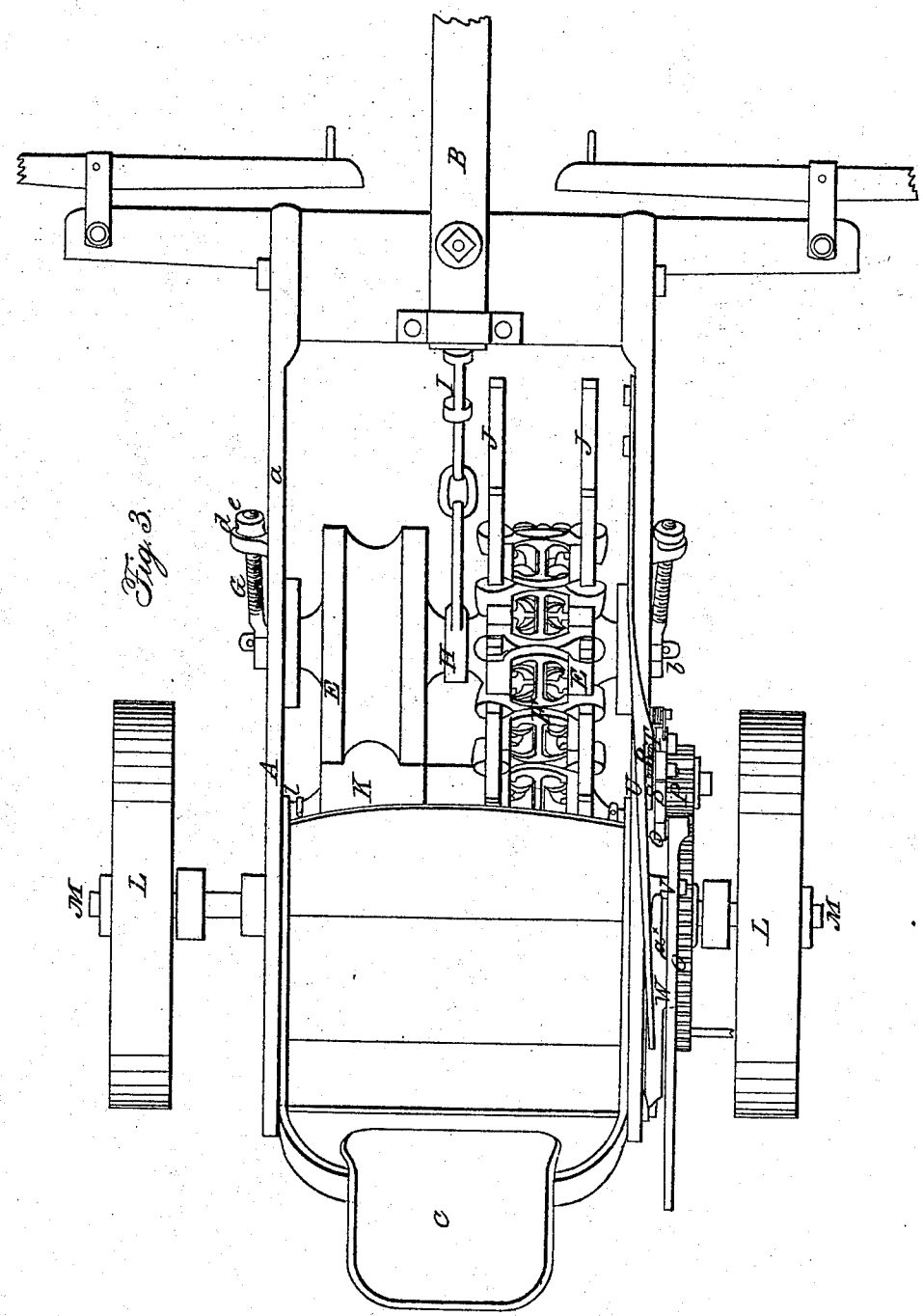

UNITED STATES PATENT OFFICE.

HENRY STANLEY, OF TROY, NEW YORK.

IMPROVEMENT IN ROTARY DIGGERS.

Specification forming part of Letters Patent No. 47,996, dated May 30, 1865.

*To all whom it may concern:*

Be it known that I, HENRY STANLEY, of Troy, in the county of Rensselaer and State of New York, have invented a new and Improved Digging-Machine; and I do hereby declare that the following is a full, clear, and exact description thereof, which will enable others skilled in the art to make and use the same, reference being had to the accompanying drawings, forming part of this specification, in which—

Figure 1, Sheet No. 1, is a side view of my invention complete in a working position; Fig. 2, Sheet No. 2, a side view of the framing of the same, showing the position of the framing when the machine is not in a working position; Fig. 3, Sheet No. 3, a plan or top view of Fig. 1; Figs. 4, 5, 6, and 7, Sheet No. 2, detached views of portions of the chain to which the teeth of the machine are attached.

Similar letters of reference indicate like parts.

This invention relates to a new and improved machine for digging up and pulverizing the soil, designed as a substitute for the spade and manual labor, and also for the plow, and as an improvement over those machines previously devised for the purpose, which are composed mainly of endless chains having teeth attached to them.

The object of my invention is to obtain a machine for the purpose specified which will be more compact than than those previously constructed, operate with less friction, and consequently require less draft, perform its work in a more thorough manner, and also be capable of being manipulated with greater facility, so that the working parts will be under the complete control of the driver.

A represents the machine in a working position, the front end of the side pieces, *a a*, being held in a suitably-elevated position by the guiding-pole B, attached to the front part of the frame A, as shown in Fig. 1; and C is the driver's seat, which may be adjusted forward and backward and secured at any desired point by means of set-screws.

D D and E E represent two pairs of rollers, over which endless chains F work. One chain only is shown, as both are precisely alike. The rollers D D, which are at the rear end of the machine and of the proper diameter to produce the desired upheaval of the earth as the chains pass around them, are placed on a shaft, *a'*, which has fixed bearings. The rollers E E are placed loosely on shaft *b*, the ends of which pass through oblong slots *c* in the side pieces, *a*, of the frame A, and have their bearings in the ends of screw-rods G, which pass through ears or lugs *d* at the sides of the frame, and have nuts *e* on them. By turning these nuts the chains F, it will be seen, may be kept at any desired degree of tension; and in order to strengthen the shaft *b* and admit of the use of as light a shaft as possible, I employ a central bearing, H, which is connected with a screw-swivel, I. (See Fig. 3.) This bearing H, which may be termed a "shaft-supporter," enables the shaft *b* to resist the force applied to draw the machine, and also enables the said shaft to resist the tension of the chains F, and if it were not employed a much larger and heavier shaft, *b*, would be necessary, thereby causing increased friction and augmenting the draft of the machine very materially.

The chains are composed of links *f g*, the links *f* being the large or chief ones, and provided at each side with two hooks or claws, *h h*, over which the smaller links, *g*, are fitted, the latter being of H or double-T form. This will be fully understood by referring to Figs. 3, 4, 6, and 7. The links *f g* may be very readily fitted together and taken apart.

The large links, *f*, are each provided with two teeth J J, which perform the digging. These teeth may be described as of chisel form, and they are made of conical form at their inner ends, as shown at *i*, Fig. 5, and are fitted in corresponding holes in the links *f*, and have projections beyond their conical end *e'*, which have screw-threads cut on them to receive nuts *j*, by which the teeth are drawn firmly into the links and securely connected to them. By giving the conical form to the fitting parts of the links and teeth the former may be very readily and uniformly fitted to the size and taper required, because all of the holes may be bored with the same reamer and all of the teeth may be readily fitted to the same uniform size and taper in the lathe, rendering them interchangeable and facilitating their removal for repairs, and by means of flanges or lips *k* on the links and the teeth being flat on the front side the th are so placed in the sockets that their at sides fit against said lips or flanges and prevent their turning. (See Fig. 4.)

The ends of links $f$ are provided with lips $b^x$, which fit over the sides of the rollers D E and prevent a lateral shifting of the chains.

K K represent two rollers, which are within the two chains F F, and serve to prevent the upward deflection of the chains and to force the teeth $j$ into the ground. (See Fig. 1.)

The machine is mounted on two wheels, L L, the arms or axles M M of which are at the ends of cranks N N, which are keyed on the shaft $a'$ of the rear chain-rollers, D D. On this same shaft $a'$ there is also firmly keyed a toothed segment, O, into which the pinion P gears, having a ratchet, Q, at its inner end.

R is an upright lever, attached to the stud on which the pinion and ratchet revolve, and has a pawl, S, attached to it, which engages with the ratchet Q of the pinion P. By moving the lever R the pawl S actuates the ratchet Q and causes the pinion P to operate the toothed segment O and turn the cranks N N, by which the rear part of the machine is elevated and the teeth J of the chains F raised up out of the ground.

T is a holding-pawl which engages with the ratchet Q. This holding-pawl is of bent form, as shown clearly in Figs. 1 and 2, and its rear part, $m$, is within the path of the movement of the rear part of pawl S, so that when the lever R is thrown forward sufficiently far for the center rear part of pawl S to come in contact with the upper end of the perpendicular arm $m$ of the pawl T a small force is sufficient to overcome the friction produced by the pressure of the ratchet against the pawl T and give it a start. Then the lower rear point of pawl S takes hold of the pawl T nearer the center of its movement and carries the front end of it and of pawl S with it quickly out of reach of ratchet Q, and the rear part of the machine will at once drop and the teeth $j$ penetrate into the earth. The casual or accidental dropping of the rear part of the machine is avoided by means of a stop formed of a shoulder or projection, $n$, on an elastic bar, U, attached to frame A, said bar having such a relative position with the lever R that the shoulder $n$ will prevent the lever being shoved sufficiently far forward to cause the pawl S to actuate or come in contact with the holding-pawl T. When this movement of the lever R is desired the bar U is pressed at one side to admit of lever R passing the shoulder $n$.

The rear part of the frame A of the machine is secured at any desired height, so that the teeth J may penetrate into the earth to the desired depth, by means of a pawl, V, which engages with the toothed segment O (see Figs. 1 and 3) and serves as a locking device.

I would remark that when the rear part of the machine is fully elevated the cranks N N are not in a vertical position, but more or less inclined back of a plane passing vertically through the axles of the wheels L L, in order that the machine may drop instantly when the ratchet Q is freed from its pawls. (See Fig. 2, in which the position of a crank at one side of the machine is shown when the rear part of the latter is fully elevated.)

The movement of the cranks is limited to the required range by stops on the frame, with which stops the arms of the toothed segment O come in contact.

The pawl V is retained in contact with the toothed segment O or freed from it by means of an elastic bar, W, provided with shoulders $a^x$ and attached to frame A.

The lever R is operated by the driver from his seat C by means of a handle, X, which is attached to segment-bar, Y, the latter passing through a slot in the upper end of the lever and secured at any desired point by a set-screw, $p$. By this arrangement the handle X may be moved or adjusted relatively with the seat C as may be required, and this movement or adjustment of the handle is necessary, for the seat C, as previously alluded to, is adjusted farther forward or backward on the frame A to suit the weight of the driver, so that the machine may be kept in a balanced state and the necks of the team relieved from unnecessary weight and the whole weight of the machine and driver brought upon the pressure-rollers; and should additional weight be required to force the teeth into the ground when working, I prefer to add it to the wheels, as in such case it will not require to be raised when raising the teeth out of the ground.

By the arrangement of the chains F, rollers D E, and intermediate rollers, K, as shown, the digging mechanism is rendered very compact, the rear rollers, D D, answering the double purpose of pressure and working rollers—that is to say, they serve to force the teeth $j$ into the ground; and by giving them (the rollers) a proper diameter they also serve, when the machine is at work, to carry the teeth out of the ground in such a manner as to leave the earth in the best possible condition.

By the employment or use of the lever R, with the pawls, ratchet, pinion, and toothed segment arranged as shown, the rear part of the machine may be raised with the greatest facility, and also allowed to drop at the will of the driver, by a very simple manipulation of said lever and without any very great effort on the part of the driver.

By constructing the chains F as shown and described the links may be connected together with the greatest facility.

Having thus described my invention, what I claim as new, and desire to secure by Letters Patent, is—

1. The combination of the H-formed links $g$ with the tooth-links $f$, provided with lugs $h$, all being constructed as specified.

2. Having the ends of the teeth made of conical form when fitting into corresponding-shaped sockets in the links, substantially as described.

3. The lips $k$ to prevent the turning of the teeth, substantially as described.

4. The employment of one or more intermediate shaft-supporters, H, in combination with the chain-rollers, substantially as herein described.

5. The employment of the toothed segment O, in combination with the wheels L, substantially as described.

6. The combination of the lever by which the digging-teeth are raised and lowered with the driver's seat, substantially as described.

7. The pawls S T, in combination with the lever R and ratchet Q, substantially as described.

8. The employment of a locking device, V, or its equivalent, in combination with the raising mechanism, substantially as and for the purpose described.

9. The employment of an adjustable driver's seat, in combination with one or more endless chains of digging-teeth, substantially as described.

10. The combination of the cranks N N with rear roller, substantially as described.

11. The employment of the raising-lever in combination with the segment or its equivalent, substantially in the manner herein shown and described.

12. The adjustable handle of the raising-lever, in combination with the raising-lever and the adjustable driver's seat.

HENRY STANLEY.

Witnesses:
M. M. LIVINGSTON,
C. L. TOPLIFF.